US008839296B2

(12) United States Patent
Makino

(10) Patent No.: US 8,839,296 B2
(45) Date of Patent: Sep. 16, 2014

(54) PROGRAM GUIDE GENERATION APPARATUS, PROGRAM GUIDE GENERATION METHOD, AND PROGRAM GUIDE GENERATION PROGRAM

(75) Inventor: Masaaki Makino, Yokohama (JP)

(73) Assignee: JVC Kenwood Corporation, Yokohama-shi (JP)

( * ) Notice: Subject to any disclaimer, the term of this patent is extended or adjusted under 35 U.S.C. 154(b) by 99 days.

(21) Appl. No.: 13/366,788

(22) Filed: Feb. 6, 2012

(65) Prior Publication Data

US 2012/0204211 A1 Aug. 9, 2012

(30) Foreign Application Priority Data

Feb. 7, 2011 (JP) ................................. 2011-024396

(51) Int. Cl.
*H04N 21/235* (2011.01)
*H04N 21/482* (2011.01)
*H04N 21/431* (2011.01)
*H04N 21/435* (2011.01)

(52) U.S. Cl.
CPC ....... *H04N 21/2353* (2013.01); *H04N 21/2355* (2013.01); *H04N 21/4821* (2013.01); *H04N 21/4314* (2013.01); *H04N 21/4355* (2013.01)
USPC ................ 725/44; 725/39; 715/800; 715/815

(58) Field of Classification Search
None
See application file for complete search history.

(56) References Cited

U.S. PATENT DOCUMENTS 7,047,547 B2 * 5/2006 Alten et al. ...................... 725/28
7,340,677 B2 * 3/2008 Cowperthwaite ............. 715/719
7,634,788 B2 * 12/2009 Gordon et al. .................. 725/41
2007/0300256 A1 * 12/2007 Coomer et al. ................. 725/44
2009/0133063 A1 * 5/2009 Sparrell .......................... 725/40
2009/0165046 A1 * 6/2009 Stallings et al. ............... 725/39

FOREIGN PATENT DOCUMENTS

| JP | 2006-210965 A | 8/2006 |
| JP | 2009-542158 A | 11/2009 |
| KR | 10-1999-0083548 A | 11/1999 |
| WO | WO-2008/002378 A1 | 1/2008 |

OTHER PUBLICATIONS

Office Action issued in Korean Application No. 10-2012-0012104 mailed Apr. 19, 2013.

* cited by examiner

*Primary Examiner* — Nasser Goodarzi
*Assistant Examiner* — Adil Ocak
(74) *Attorney, Agent, or Firm* — Venable LLP; Michael A. Sartori; George L. Howarah

(57) ABSTRACT

A program guide generation apparatus includes: a program-related information acquisition unit that acquires program-related information including information related to a start time of a broadcast program, information related to a broadcast duration length being the length of the duration of the broadcast of the broadcast program; a program display frame size calculation unit that calculates a time-base size obtained from the broadcast duration length and calculates an inside content size; a program guide generation unit that generates layout data of the program display frame in accordance with the time-base size calculated by the program display frame size calculation unit; and a display update unit that, upon a program display frame being selected by an operation input inputted via an input device, changes a size of the selected program display frame to the inside content size.

3 Claims, 17 Drawing Sheets

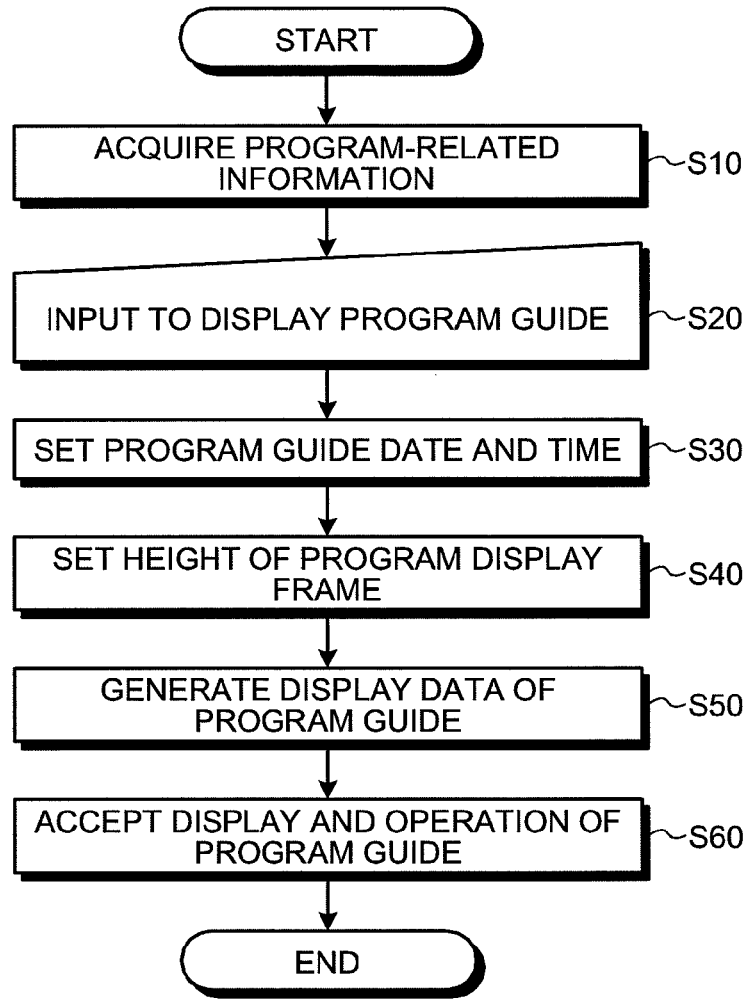

FIG.5

| PROGRAM-RELATED INFORMATION ID / PROGRAM-RELATED INFORMATION ITEM | PROGRAM 1 | PROGRAM 2 | ... |
|---|---|---|---|
| BROADCASTING STATION ID | BROADCASTING STATION 1 | BROADCASTING STATION 2 | ... |
| START TIME | 01-31-2011 17:25:00 | 01-31-2011 17:30:00 | ... |
| FINISH TIME | 01-31-2011 17:30:00 | 01-31-2011 18:00:00 | ... |
| BROADCAST DURATION | 5 MINUTES | 30 MINUTES | ... |
| PROGRAM TITLE | FIVE-MINUTE NEWS 1725 | THE BOY APRIL | ... |
| PROGRAM SUMMARY | DELIVERY OF TODAY'S NEWS AND WEATHER REPORT | THE STORY OF LOVE AND FRIENDSHIP OF A BASEBALL BOY WHO FIGHTS AGAINST HIS OWN DESTINY AND AIMS FOR KOSHIEN: STARTING YDA TARO | ... |
| GENRE | NEWS | DRAMA | ... |

FIG.6

| LAYOUT ITEM | VALUE |
|---|---|
| PROGRAM-RELATED INFORMATION ITEM TO BE DISPLAYED | START TIME, PROGRAM TITLE, PROGRAM SUMMARY |
| PROGRAM DISPLAY FRAME PADDING | 5 px |
| START TIME FONT SIZE | 11 px |
| START TIME DISPLAY POSITION | (0, 0) |
| PROGRAM TITLE FONT SIZE | 14 px |
| PROGRAM TITLE DISPLAY POSITION | DIRECTLY BELOW START TIME |
| PROGRAM SUMMARY FONT SIZE | 12 px |
| PROGRAM SUMMARY DISPLAY POSITION | DIRECTLY BELOW PROGRAM TITLE |
| LINE-SPACING SIZE | 20 px |

FIG.7

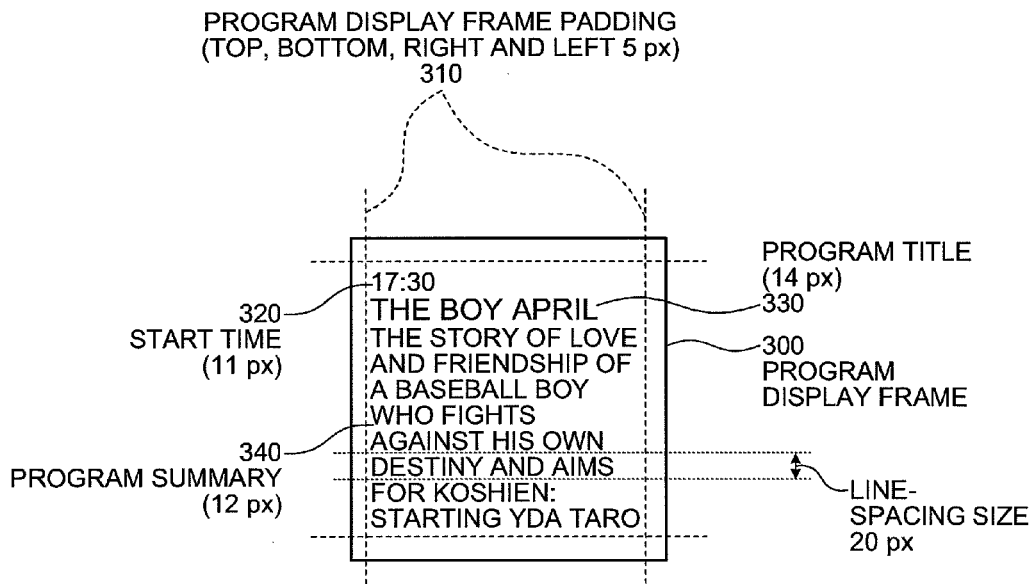

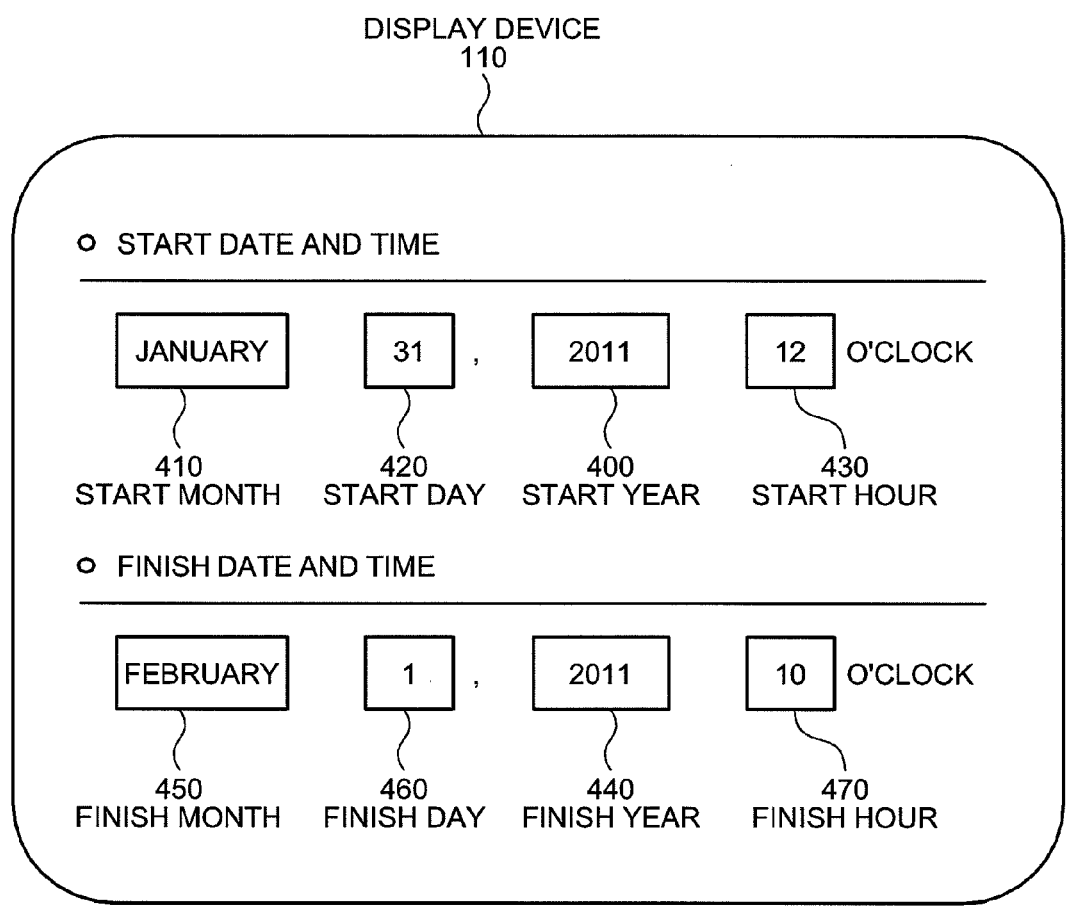

FIG.13

|  | PROGRAM-RELATED INFORMATION ID |
|---|---|
| CURRENTLY FOCUSED PROGRAM DISPLAY FRAME | PROGRAM 1 |
| PREVIOUSLY FOCUSED PROGRAM DISPLAY FRAME | PROGRAM 2 |

FIG.16A

| | AAA TELEVISION ▷ | ... |
|---|---|---|
| 17 O'CLOCK | 17:00 SHOPPING CURRENTLY FASHIONABLE I | |
| | 17:25 | ... |
| 18 O'CLOCK | 17:30 MECHANISM OF SPACE WHAT WAS THE MESSAGE CAUGHT BY THE SPACE PROBE? DOCUMENTARY THAT APPROACHES THE TRUTH OF THE CREATION OF THE UNIVERSE. | |
| | ⋮ | ⋮ |

CURSOR POINTER 510

PROGRAM DISPLAY FRAME 540

FIG.16B

| | AAA TELEVISION | ... |
|---|---|---|
| 17 O'CLOCK | 17:00 SHOPPING CURRENTLY FASHIONABLE I | |
| | 17:25 FIVE-MINUTE NEWS 1725 ▷ DELIVERY OF TODAY'S NEWS AND WEATHER REPORT | ... |
| 18 O'CLOCK | 17:30 MECHANISM OF SPACE WHAT WAS THE MESSAGE CAUGHT BY THE SPACE PROBE? DOCUMENTARY THAT APPROACHES THE TRUTH OF THE CREATION OF THE UNIVERSE. | |
| | ⋮ | ⋮ |

PROGRAM DISPLAY FRAME 540

CURSOR POINTER 510

FIG.18A FIG.18B FIG.18C

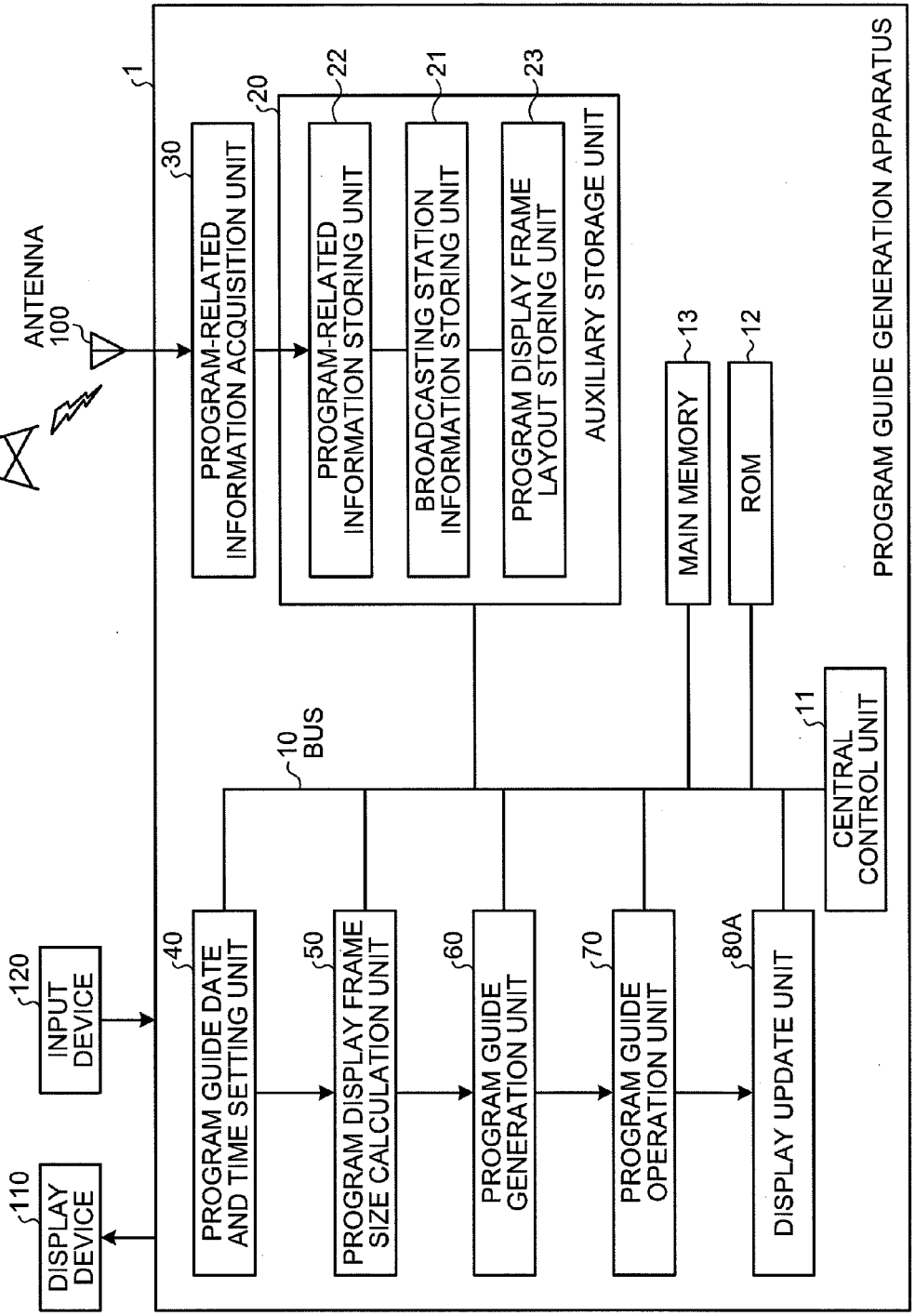

PROGRAM GUIDE GENERATION APPARATUS, PROGRAM GUIDE GENERATION METHOD, AND PROGRAM GUIDE GENERATION PROGRAM

CROSS-REFERENCE TO RELATED APPLICATIONS

The present application claims priority to and incorporates by reference the entire contents of Japanese Patent Application No. 2011-024396 filed in Japan on Feb. 7, 2011.

BACKGROUND OF THE INVENTION

1. Field of the Invention

The present invention relates to a program guide generation apparatus, a program guide generation method and a program guide generation program, each for generating an electronic program guide based on program-related information being information related to broadcast programs.

2. Description of the Related Art

Upon a search for a broadcast program or a video content recorded in a recorder, an electronic program guide has been widely used in recent years to search for a desired video content by displaying the electronic program guide on a TV screen. Such a technology is described in Japanese Patent Application Laid-open No. 2006-210965, for example. There may be a case that the layout of such an electronic program guide is displayed in a grid layout where times are placed in a vertical direction, broadcasting stations are placed in a horizontal direction, and placed in a position where a time coincides with a broadcasting station is program information on a program to be broadcast at the time by the broadcasting station. The layout is a format that imitates one called the Radio/TV listings that has been widely used in a program schedule in paper media such as news papers and magazines since before the advent of an electronic program guide. Therefore, users are familiar with the layout and can easily understand operations thereof.

Incidentally, in a program guide in the Radio/TV listings format, the position of a cell to display information on a program needs to be adjusted to a grid of a time corresponding to the broadcast time of the program. For example, in the case of a program broadcast from 0 o'clock to 1 o'clock, the top side of a cell displaying program information is adjusted to a position indicating 0 o'clock on a time axis of a program guide, the bottom side of the cell displaying program information is adjusted to a position indicating 1 o'clock on the time axis of the program guide. Information on the program is described in the cell size from 0 o'clock to 1 o'clock; however, there is a problem that all the information on the program cannot be displayed, depending on the cell size and the amount of the program information. Especially, the electronic program guide is mechanically generated; accordingly, it is difficult to design layout with flexibility as in a program schedule in paper media generated manually. Hence, an electronic program guide is often generated in the following layout (1) and (2).

(1) Layout where a cell size is fixed to a length determined by the duration of the broadcast to display only the amount of program information that can be displayed.

(2) Layout where a cell size expands in accordance with the program information.

The above layout of (1) and (2) have advantages and disadvantages, respectively. In the layout (1), in terms of the number of programs that can be displayed on one screen, more programs can be displayed than the layout (2) can since a size in the time axis direction is fixed regardless of the number of programs and the amount of program information. Moreover, the work of the operation of scrolling down a screen required when a program in the lower part of the program guide is wished to be displayed can be minimized. However, in the case of a program having a short broadcast duration, there is a problem that the information cannot be displayed and the cell size becomes too small to display even one character in some cases.

On the other hand, in the layout (2), it is possible to check all information on a program since a cell size expands in accordance with the program information. However, the size extends in the time axis direction of the program guide; accordingly, there is a problem that the number of programs to be displayed on one screen decreases. Moreover, it is necessary to repeat the operation of scrolling down the screen due to the expansion of the size in the time axis direction when a program in the lower part of the program guide is wished to be displayed.

Moreover, as an example application of the layout (1), a method where an area for displaying information on a program is provided in an area other than a program guide is used, too; however, the area needs to be displayed on a screen all the time, so that there is a problem that an area where a program guide can be displayed inevitably becomes small. Moreover, as a custom layout of (1), a method may also be employed that a minimum value of a cell size is set. However, this method, too, has a problem that only a part of program information can be displayed. Additionally, if a minimum value is set to be large, a problem similar to (2) arises.

SUMMARY OF THE INVENTION

It is an object of the present invention to at least partially solve the problems in the conventional technology.

According to an aspect of the present invention a program guide generation apparatus includes: a program-related information acquisition unit configured to acquire program-related information including information related to a start time of a broadcast program, information related to a broadcast duration length being the length of the duration of the broadcast of the broadcast program, and bibliographical information on the broadcast program, for each broadcast program; a program display frame size calculation unit configured to calculate a time-base size obtained from the broadcast duration length and calculate an inside content size being a size of a program display frame being a cell to display the program-related information, the size being necessary to display all of first program-related information being information to be displayed in the program display frame among the program-related information, based on the first program-related information; a program guide generation unit configured to generate layout data of the program display frame in accordance with the time-base size calculated by the program display frame size calculation unit; and a display update unit configured, upon a program display frame being selected by an operation input inputted via an input device, to change a size of the selected program display frame to the inside content size.

According to another aspect of the present invention a program guide generation method includes: accruing program-related information including information related to a start time of a broadcast program, information related to a broadcast duration length being the length of the duration of the broadcast of the broadcast program, and bibliographical information on the broadcast program, for each broadcast program; calculating a time-base size obtained from the broadcast duration length and calculating an inside content size being a size of a program display frame being a cell to display the program-related information, the size being necessary to display all of first program-related information being information to be displayed in the program display frame among the program-related information, based on the first program-related information; generating layout data of the program display frame in accordance with the time-base size calculated by the program display frame size calculation unit; and changing a size of the selected program display frame to the inside content size upon a program display frame being selected by an operation input inputted via an input device.

According to still another aspect of the present invention a computer-readable recording medium that stores therein a computer program for outputting information, the computer program causing a computer to execute: accruing program-related information including information related to a start time of a broadcast program, information related to a broadcast duration length being the length of the duration of the broadcast of the broadcast program, and bibliographical information on the broadcast program, for each broadcast program; calculating a time-base size obtained from the broadcast duration length and calculating an inside content size being a size of a program display frame being a cell to display the program-related information, the size being necessary to display all of first program-related information being information to be displayed in the program display frame among the program-related information, based on the first program-related information; generating layout data of the program display frame in accordance with the time-base size calculated by the program display frame size calculation unit; and changing a size of the selected program display frame to the inside content size upon a program display frame being selected by an operation input inputted via an input device.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is a flowchart illustrating a process flow of the program guide generation apparatus;

FIG. 4 is a view illustrating an example of a format of a broadcasting station information storing unit;

FIG. 5 is a view illustrating an example of a format of a program-related information storing unit;

FIG. 6 is a view illustrating an example of a format of a program display frame layout storing unit;

FIG. 7 is a view illustrating a specific example of a program display frame;

FIG. 8 is a view illustrating an example of a GUI presented by a program guide date and time setting unit;

FIG. 13 is a view illustrating an example of a format that stores the state of focus;

FIGS. 16A and 16B are views illustrating a change in a program guide that occurs due to focus transition;

FIGS. 18A, 18B and 18C are views illustrating a problem that occurs during focus transition;

FIG. 19 is a block diagram of a program guide generation apparatus in a second embodiment.

DETAILED DESCRIPTION OF THE PREFERRED EMBODIMENTS

First Embodiment

A description will hereinafter be given of a program guide generation apparatus, a program guide generation method, and a program guide generation program of a first embodiment of the present invention with reference to the drawings. Incidentally, in the following description, to display information by symbols and character images is referred to simply as to display information. Moreover, that a program (program display frame) is designated by an operation input from an input device is referred to as to be focused.

Figure 1:
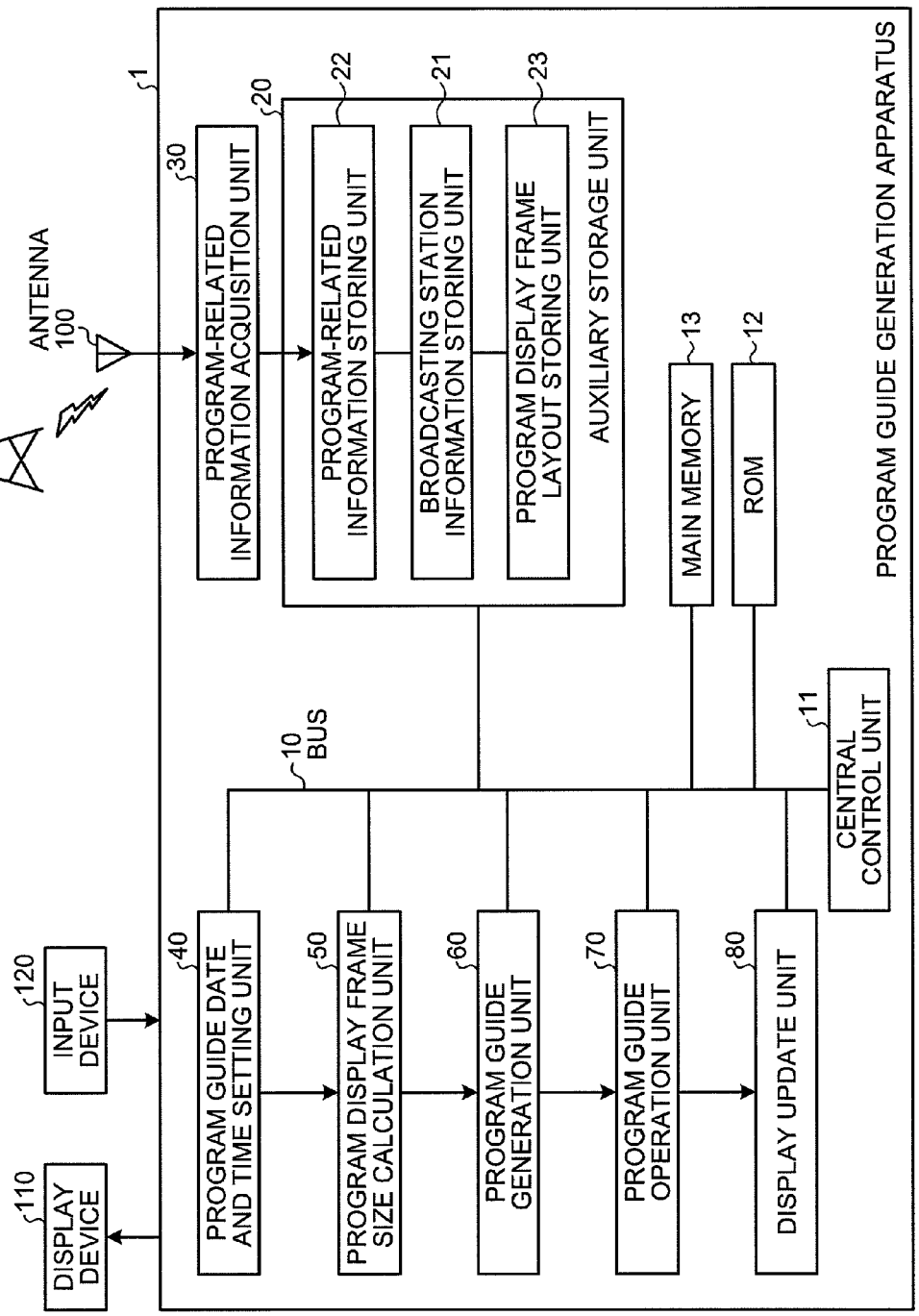
FIG. 1 is a block diagram of a program guide generation apparatus in a first embodiment.

FIG. 1 is a block diagram illustrating a preferable configuration of a program guide generation apparatus in the first embodiment of the present invention. A program guide generation apparatus 1 in FIG. 1 includes: a central control unit 11; a ROM 12, main memory 13; an auxiliary storage unit 20; a program-related information acquisition unit 30; a program guide date and time setting unit 40; a program display frame size calculation unit 50; a program guide generation unit 60; a program guide operation unit 70; and a display update unit 80, and they are connected each other via a bus 10.

Moreover, the program guide generation apparatus 1 is connected to a display device 110 and an input device 120. The display device 110 is a device such as a CRT or liquid crystal display for displaying information for a user. The input device 120 is an input device such as a keyboard, mouse, touch panel, or remote controller operated by a user.

Incidentally, FIG. 1 illustrates the program guide generation apparatus 1 in a functional block diagram with a hardware configuration; however, one or a plurality of computers may be caused to execute software programs to function as the whole or part of the program guide generation apparatus 1. For example, part of the program-related information acquisition unit 30, the program guide date and time setting unit 40, the program display frame size calculation unit 50, the program guide generation unit 60, the program guide operation unit 70 and the display update unit 80 may be executed by software on a PC including memory and a CPU.

An electronic program guide displayed by the program guide generation apparatus 1 is configured in a grid layout that displays a time frame 200 (indicated by a chain double dashed line in FIG. 2) being a group of cells to show times in a first column, and displays broadcasting station frames 210

Figure 2:
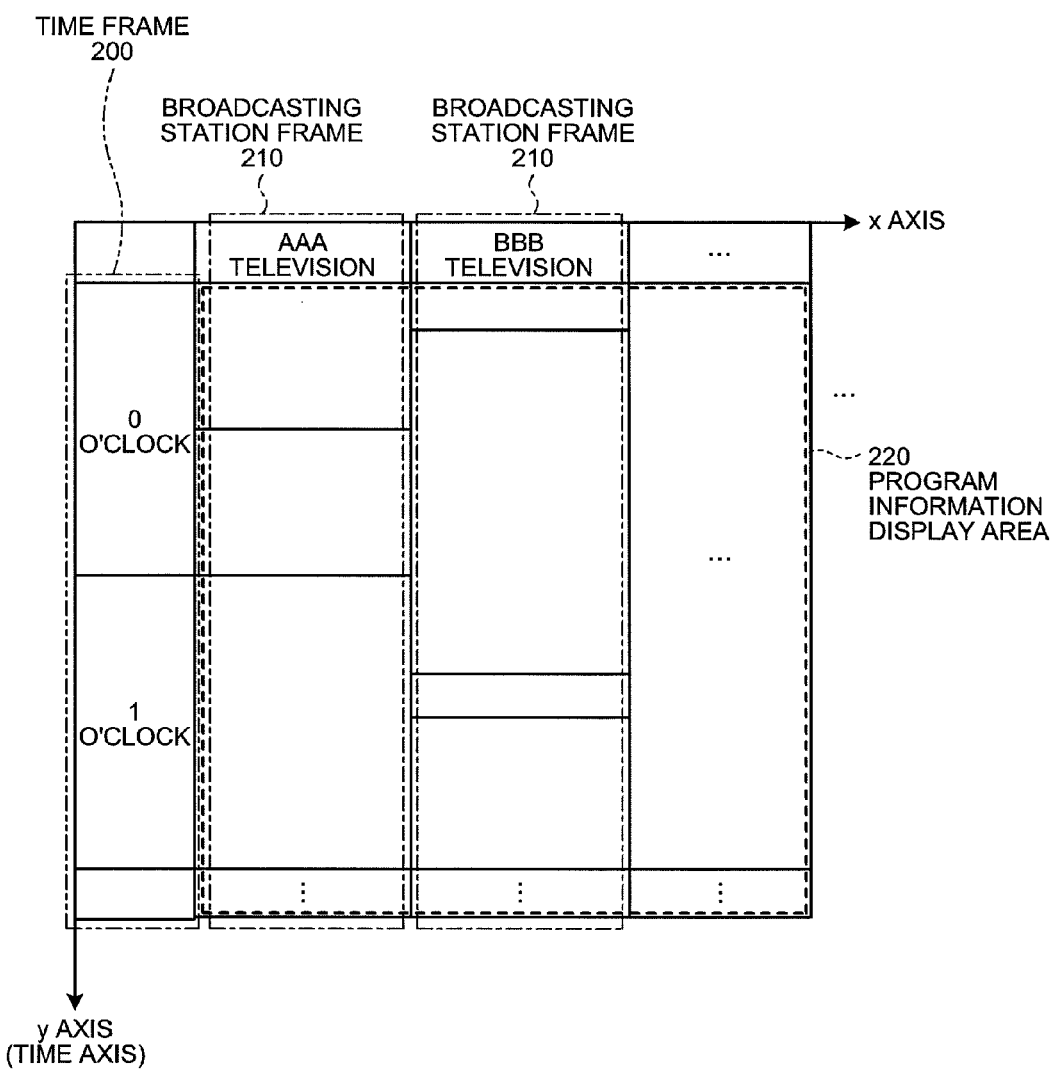
FIG. 2 is a view illustrating an example of an electronic program guide layout generated by the program guide generation apparatus.

(indicated by dot and dash lines in FIG. 2) being groups of cells to display broadcast contents by classification according to broadcasting stations in a second column and later. FIG. 2 illustrates an example of an electronic program guide in a grid layout displayed by the program guide generation apparatus 1. The time frame 200 in FIG. 2 is a group of cells to show times, and 0 o'clock and 1 o'clock are displayed in FIG. 2. Cells to display broadcast programs broadcast by a broadcasting station "AAA Television" and cells to display broadcast programs broadcast by a broadcasting station "BBB Television" are shown as examples of the broadcasting station frames 210 in FIG. 2. In a program information display area 220 (indicated by a broken line in FIG. 2), program display frames are placed, for the respective broadcasting stations, in positions where times that programs are broadcast coincide with broadcasting stations that broadcast the programs in accordance with programs to be broadcast. Incidentally, the x axis and the y axis (time axis) are illustrated in FIG. 2 to facilitate understanding; however, the time axis actually is not necessarily illustrated. Moreover, in FIGS. 14A and 14B, 16A and 16B, 17A and 17B and 18A, 18B and 18C, which will be described later, the illustrations of the x axis and the y axis (time axis) are omitted.

Next, a description will be given of a general flow of the process of the program guide generation apparatus 1 generating an electronic program guide with reference to the flowchart illustrated in FIG. 3.

Firstly, the program-related information acquisition unit 30 acquires program-related information from a broadcasting station 1000 via an antenna 100 and stores the program-related information in a program-related information storing unit 22 (Step S10).

Next, the central control unit 11 waits for a user input for starting the display of a program guide (Step S20). The input from a user is executed via the input device 120.

Next, the program guide date and time setting unit 40 requires the user to input a date and time range that displays an electronic program guide (Step S30).

Next, the program display frame size calculation unit 50 calculates the height of a program display frame for displaying related information of each program (Step S40).

Next, the program guide generation unit 60 generates image data for displaying a program guide based on the height of each program display frame calculated in Step S40 (Step S50).

Next, the program guide operation unit 70 displays the display data of the program guide on the display device 110 to accept an input operation from the user as well as causes the display update unit 80 to update the program guide layout whenever a focused program display frame (a program display frame designated by the operation input from the input device) is changed (Step S60).

The above is the description of the process flow of the program guide generation apparatus 1 displaying an electronic program guide.

Next, a detailed description will be given of the units of the program guide generation apparatus 1. The central control unit 11 is a unit for controlling the entire operation of the program guide generation apparatus 1, and includes a CPU (Central Processing Unit), a PLD (Programmable Logic Device), and the like. The ROM 12 is a read-only recording medium, and stores basic control programs for controlling the entire program guide generation apparatus 1. The main memory 13 is a work area for the central control unit 11 to execute a program, and is configured of RAM memory or the like.

The auxiliary storage unit 20 is a large capacity recording medium such as an HDD (Hard Disk Drive) or an SSD (Solid State Drive), and includes a broadcasting station information storing unit 21, the program-related information storing unit 22, and a program display frame layout storing unit 23 therein.

The broadcasting station information storing unit 21 stores a broadcasting station ID being an identifier for uniquely identifying a broadcasting station and the name of a broadcasting station. FIG. 4 illustrates an example of a format of the broadcasting station information storing unit 21. FIG. 4 illustrates that the broadcasting station name of a broadcasting station whose broadcasting station ID is "broadcasting station 1" is "AAA Television," and the broadcasting station name of a broadcasting station whose broadcasting station ID is "broadcasting station 2" is "BBB Television."

The program-related information storing unit 22 associates program-related information including the broadcasting station ID of a broadcasting station, the start time and finish time of a program, the duration of the broadcast, the title of the program, a summary of the program, and a genre of the program with a program-related information ID being an identifier for uniquely identifying program-related information to store the program-related information. Incidentally, individual pieces of information constituting program-related information such as a broadcasting station ID and the start time of a program are referred to as program-related information items. FIG. 5 is a view illustrating an example of a format of program-related information stored in the program-related information storing unit 22. In FIG. 5, a description will be given, taking an example of program-related information where a program-related information ID is a program 1. The broadcasting station ID of a broadcasting station is the broadcasting station 1, the start time is "01-31-2011 17:25: 00," the finish time is "01-31-2011 17:30:00," the duration of the broadcast is "five minutes," the program title is "Five-minute news 1725," the program summary is "Delivery of today's news and weather report" and the genre is "news." These pieces of information indicate that: a program shown as the program 1 is a program broadcast by the broadcasting station ID "broadcasting station 1"; the broadcast time is from 17:25 to 17:30 on Jan. 31, 2011 for five minutes; the program title is "Five-minute news 1725"; the summary indicating the content is "Delivery of today's news and weather report"; and the program is categorized as the genre "news."

The program display frame layout storing unit 23 stores the settings that which program-related information items are to be displayed and rendered in what layout in a program display frame. Specifically, the settings of kinds, rendering positions, font sizes, line-spacing size, and internal padding of program-related information items to be displayed are stored. FIG. 6 illustrates an example of layout information stored in the program display frame layout storing unit 23. In FIG. 6, program-related information items to be displayed in a program display frame are the start time, the program title and the program summary, and the internal padding of the program display frame is set to 5 px (pixels), the font size of the start time to 11 px, the display position of the start time to a position of (0, 0) with a base point of the top left corner of the program display frame, the font size of the program title to 14 px, the display position of the program title to directly below the start time, the font size of the program summary to 12 px, the display position of the program summary to directly below the program title, and the line-spacing size to 20 px.

FIG. 7 illustrates an example of a program display frame where the program 1 illustrated in FIG. 5 has actually been rendered based on the layout settings in FIG. 6. In FIG. 7, a start time 320, a program title 330, and a program summary 340 are rendered in a program display frame 300. A program display frame padding 310 being an internal padding of the program display frame 300 is 5 px based on the layout settings, and top and bottom, left and right areas indicated by broken lines in FIG. 7, each equivalent to 5 px, are the internal padding of the program display frame 300.

The content of the start time 320 is "17:30," and is rendered in 11 px with a base point of the coordinates of the top left corner (0, 0) (substantially the coordinates of (6, 6) since the padding is added) of a program display frame based on the layout settings in FIG. 7. The content of the program title 330 is "The Boy April," and is rendered in 14 px directly below the start time 320. The content of the program summary 340 is "The story of love and friendship of a baseball boy who fights against his own destiny and aims for Koshien: staring Yda Taro," and is rendered in 12 px directly below the program title 330. Moreover, line spaces are rendered in 20 px.

The program-related information acquisition unit 30 receives program-related information distributed by the broadcasting station 1000 via the antenna 100 to store the received program-related information in the program-related information storing unit 22. Program-related information items of the program-related information received by the program-related information acquisition unit 30 are: the title of a program; the start time of the program; the finish time of the program; the duration of the broadcast being the length of the program; the broadcasting station; the summary of the program; a genre of the program such as news, a drama or an animation; and the like. Incidentally, the duration of the broadcast can be obtained by calculating the difference between the start time and the finish time.

Incidentally, the program-related information acquisition unit 30 may acquire program-related information via an unillustrated network line instead of the antenna 100. Moreover, program-related information may not be obtained directly from the broadcasting station 1000, but program-related information may be obtained from a database of program-related information, the database being provided by a third party, and the like.

The program guide date and time setting unit 40 requires a user to set the date and time range of a program to be displayed on an electronic program guide (the program guide date and time). Data on years, months, days, and hours of the start and finish dates and times are set in the program guide date and time. Moreover, the program guide date and time setting unit 40 causes the display device 110 to display a GUI (graphical user interface) for assisting the input operation of a user.

FIG. 8 illustrates an example of a GUI presented by the program guide date and time setting unit 40. In FIG. 8, a GUI for setting a start date and time and a finish date and time is displayed on the display device 110. Specifically, a user is caused to directly input a start year of a program guide in a start year 400, a start month of the program guide in a start month 410, a start day of the program guide in a start day 420, and a start time of the program guide in a start hour 430, respectively, to set the start date and time. If in the state of FIG. 8, the start date and time is set to Jan. 31, 2011 12 o'clock. Moreover, a user is caused to directly input a finish year of the program guide in a finish year 440, a finish month of the program guide in a finish month 450, a finish day of the program guide in a finish day 460, and a finish time of the program guide in a finish hour 470, respectively, to set the finish date and time. If in the state of FIG. 8, the finish date and time is set to Feb. 1, 2011 10 o'clock. Incidentally, the program guide date and time setting unit 40 may automatically set the date and time range of a program to be displayed on an electronic program guide (the program guide date and time) based on the current time and the like. For example, the date and time range (the program guide date and time) from the current time to a certain time may be automatically set.

The program display frame size calculation unit 50 calculates a height necessary for a program display frame for each piece of program-related information stored in the program-related information storing unit 22. Two types of heights of a program display frame generated by the program display frame size calculation unit 50 are calculated: a time-base height calculated based on the duration of the broadcast of a program, and an inside content height being a height necessary to display all the display content of program-related information when a program display frame is rendered in accordance with the layout set in the program display frame layout storing unit 23. Incidentally, the time-base height is determined in accordance with the duration of the broadcast of a program, and the inside content height is determined in accordance with the information amount (the number of characters and the like) of information (such as a start time, finish time, program title and program summary) to be displayed in a program display frame among program-related information. For example, as the number of characters of a program title increases, the value of the inside content height becomes larger.

Figures 9, 10:
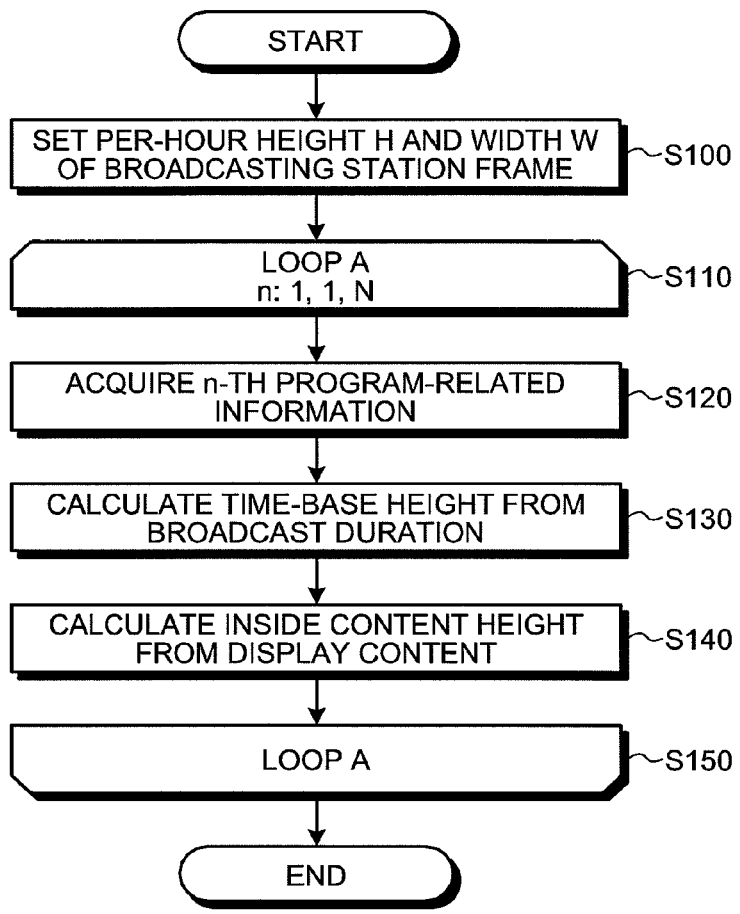
FIG. 9 is a flowchart illustrating a process flow of a program display frame size calculation unit.
FIG. 10 is a view illustrating an example of a format that stores a time-base height and an inside content height.

A description will be given of a process flow of calculating the height of a program display frame by the program display frame size calculation unit 50 with reference to the flowchart of FIG. 9.

First, the program display frame size calculation unit 50 sets a per-hour height on the time axis of a program guide and the width of a broadcasting station frame (Step S100). These values are preset by the designer of the program display frame size calculation unit 50, but may be designed to be able to be set by a user via the input device. Incidentally, a per-hour height and the width of a broadcasting station frame, which are set here, are set as H and W, respectively. All of the widths W of the broadcasting station frames are basically the same regardless of the broadcasting stations, but the value may be set to vary among the broadcasting stations. The value of per-hour height H may be set to change according to a time, too. For example, the large value may be set for the height H of a time slot that broadcast programs are often viewed, such as from 19 o'clock to 23 o'clock.

Next, assuming that the number of contents (the number of programs) stored in the program-related information storing unit 22 is N, the program display frame size calculation unit 50 executes the iterations of a loop until a loop counter n starting at one in increments of one reaches an end value N for a loop identifier "loop A" (Step S110).

Next, the program display frame size calculation unit 50 acquires the n-th program-related information (hereinafter referred to as the program-related information n) among program-related information stored in the program-related information storing unit 22 (Step S120).

Next, the program display frame size calculation unit 50 calculates the time-base height of a program display frame of the program-related information n based on the duration of the broadcast of the program-related information n (Step S130). Assuming that the duration of the broadcast of the program-related information n in units of hours is $T_h$ and a per-hour height set in Step S100 is H, a time-base height $H_t(n)$ of the program display frame of the program-related information n is obtained by the following mathematical expression (1).

$$H_t(n) = T_h \cdot H \tag{1}$$

Here, a specific example of the calculation of a time-base height is shown by use of the example of the program-related information illustrated in FIG. 5. Assuming that the per-hour height H set in Step S100 is H=300 px (px represents pixels), the duration of the broadcast of the program-related information whose program-related information ID is the program 1, the information being illustrated in FIG. 5, is five minutes; accordingly, the time-base height of the program 1 is obtained as $H_t(1)=300\times5/60=25$ px. Moreover, the duration of the broadcast of the program 2 is 30 minutes; accordingly, the time-base height of the program 2 is obtained as $H_t(2)=300\times30/60=150$ px.

Next, an inside content height being the height of a program display frame necessary to display the whole display content of the program-related information n in the program display frame is calculated (Step S140). The inside content height is calculated based on the layout information stored in the program display frame layout storing unit 23. If the inside content height is calculated from the layout example of the program display frame layout storing unit 23 illustrated in FIG. 6, the inside content height is calculated based on the top and bottom padding sizes+a line-spacing size x the number of lines. If a specific numeric value is calculated for the display example of the program 2 illustrated in FIG. 7, the total of the program display frame padding at the top and the program display frame padding at the bottom is 10 px, the line-spacing size is 20 px, and the number of lines is 7, so that the numeric value is calculated as $10+20\times7=150$ px.

The symbol shown in the next step S150 is a loop termination symbol of the loop A. If the loop A satisfies a termination condition (if the inside content heights of all contents are finished being calculated), the program display frame size calculation unit 50 terminates the process of calculating the heights of program display frames. If the termination condition is not satisfied, execution returns to Step S110 to repeat the processing.

Incidentally, the program display frame size calculation unit 50 associates the calculated time-base height and inside content height with the program-related information ID to store the time-base height and the inside content height in the main memory 13. FIG. 10 illustrates an example of a format that stores height information on a program display frame stored in the main memory 13. FIG. 10 illustrates that the time-base height of the program display frame whose program-related information ID is the program 1 is 25 px, the inside content height is 130 px, the time-base height of the program display frame whose program-related information ID is the program 2 is 150 px, and the inside content height is 150 px.

The above is the description of the program display frame size calculation unit 50.

Figure 11:
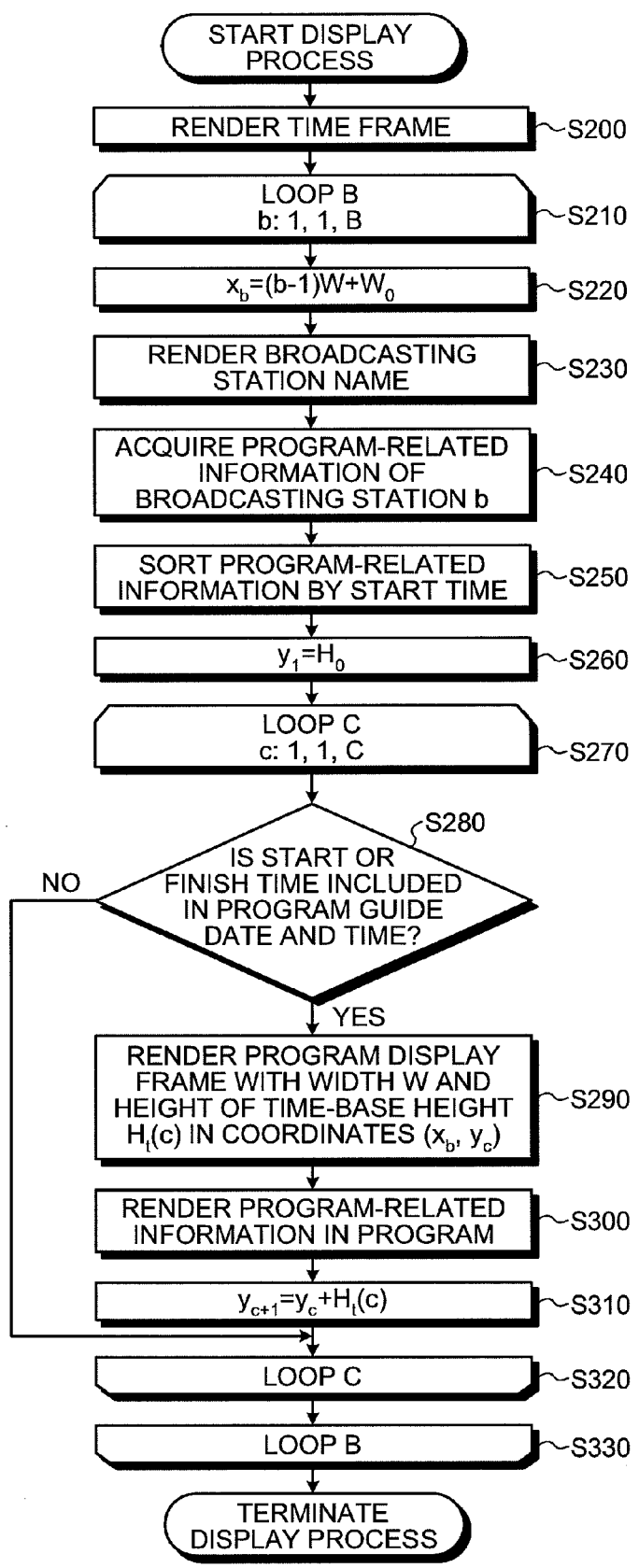
FIG. 11 is a flowchart illustrating a process flow of a program guide generation unit.

The program guide generation unit 60 generates the layout data of the entire electronic program guide using the time-base height calculated by the program display frame size calculation unit 50. A description will be given of a process flow of the program guide generation unit 60 generating the layout data of the entire electronic program guide with reference to the flowchart illustrated in FIG. 11. Firstly, the program guide generation unit 60 renders rectangles the same size with the width $W_0$ and the height H in a line in the y-axis direction, based on the program guide date and time set by the program guide date and time setting unit 40, and renders a numeric value representing a time in the center of each rectangle; accordingly, the time frame is rendered (Step S200). If a specific example is shown, assuming that as the program guide date and time, a time of a start date and time is set to 0 o'clock and a time of a finish date and time to 12 o'clock, 12 rectangles from 0 o'clock to 11 o'clock are arranged vertically to be rendered. If the time frame is rendered in hours, the height of the time frame is rendered in the same height as the per-hour height H. There is no particular rule of a specific numeric value of the width $W_0$ of the time frame; however, it is sufficient if there is a width of approximately 10 to 20 px.

Next, assuming that the number of broadcasting station IDs stored in the broadcasting station information storing unit 21 is B, the program guide generation unit 60 executes the iterations of a loop until a loop counter b starting at one in increments of one reaches an end value B for a loop identifier "loop B" (Step S210).

Next, the program guide generation unit 60 calculates $x_b$, being an x-coordinate value of the broadcasting station frame of a broadcasting station b (Step S220). Assuming that the width of the broadcasting station frame is W and the width of the time frame is $W_0$, the x-coordinate value xb of the broadcasting station frame of the broadcasting station b is calculated by the following mathematical expression (2).

$$x_b=(b-1)W+W_0 \qquad (2)$$

Next, the program guide generation unit 60 renders a display frame for displaying a broadcasting station name in a position of coordinates of $(x_b, 0)$ with the width $W_0$ and the height $H_0$, and a broadcasting station name corresponding to the b-th broadcasting station ID (hereinafter referred to as the broadcasting station b) among the broadcasting stations stored in the broadcasting station information storing unit 21 is rendered in the frame (step S230). The height $H_0$ is arbitrary, and it is sufficient if the height $H_0$ is high enough to display a broadcasting station name.

Next, the program guide generation unit 60 acquires all program-related information whose broadcasting station ID is the broadcasting station b from the program-related information storing unit 22 (Step S240).

Next, the program guide generation unit 60 sorts the program-related information acquired in Step S240 in ascending order of start time (Step S250).

Next, the program guide generation unit 60 initializes a variable y being a variable for determining a y-coordinate value of the program display frame to $H_0$ being the height of the display frame of the broadcasting station name (Step S260).

Next, assuming that the number of the program-related information acquired in Step S240 is C, the program guide generation unit 60 executes the iterations of a loop until a loop counter c starting at one in increments of one reaches an end value C for a loop identifier "loop C" (Step S270).

Next, the program guide generation unit 60 judges whether or not a start time or finish time of the c-th program-related information (hereinafter referred to as the program-related information c) among the program-related information acquired in Step S240 is included in the program guide date and time set by the program guide date and time setting unit 40 (Step S280). If it is judged that one of a start time or finish time is included in the program guide date and time set by the program guide date and time setting unit 40, execution proceeds to Step S290, otherwise execution proceeds to Step S320.

If it is judged that the start time or finish time of the program-related information c is included in the program guide date and time (Step S280, Yes), the program guide generation unit 60 renders a program display frame (Step S290). Specifically, a rectangle whose width is W and whose height is a time-base height $H_t(c)$ obtained from the duration of the broadcast of the program-related information c is rendered in a position of coordinate values of $(x_b, y_c)$.

In the case where the start time of the program-related information c is an older time than the start time of the program guide date and time, a time length is obtained from the difference between the start time of the program guide date and time and the finish time of the program-related information c, and the time-base height obtained by the mathematical expression (1) is used as the height of the program display frame. For example, if a program indicated by the program-related information c is from Jan. 31, 2011 23:55 (start time) to the following day 0:40 (finish time), and the start time of the program guide date and time is Feb. 1, 2011 0:00, a time-base height is obtained from 40 minutes being the time length of Feb. 1, 2011 0:00 to 0:40, using the mathematical expression (1).

Moreover, also in the case where the finish time of the program-related information c is an older time than the finish time of the program guide date and time, a time length is obtained from the difference between the start time of the program-related information c and the finish time of the program guide date and time, and the time-base height obtained by the mathematical expression (1) is used as the height of a program display frame.

Next, the content of the program-related information c is rendered in the program display frame rendered in Step S290 in accordance with the settings stored in the program display frame layout storing unit 23 (Step S300). Incidentally, if text information such as a program title and a program summary cannot be contained in one line in a program display frame upon rendering, a new line is started to display the text information. Moreover, if a height necessary for rendering all program-related information items is not sufficient and all the program-related information items cannot be contained in a program display frame, the program-related information items are clipped at the program display frame to erase a part that extends off in the y-axis direction.

Next, the coordinate value y is changed (Step S310). Assuming that the current y-coordinate value is y, and the time-base height obtained from the duration of the broadcast of the product-related information c is $H_t(c)$, an updated y-coordinate value, $y_c+1$, is obtained by the following mathematical expression (3).

$$y_{c+1} = y_c + H_t(c) \quad (3)$$

The symbol shown in the next step S320 is a loop termination symbol of a loop C. If the loop C satisfies the termination condition, execution proceeds to Step S330, and if the termination condition is not satisfied, execution returns to Step S270 to repeat the processing.

The symbol shown in the next step S330 is a loop termination symbol of a loop B. If the loop B satisfies the termination condition, the display process is terminated, and if the termination condition is not satisfied, execution returns to Step S210 to repeat the processing.

The above is the description of the program guide generation unit 60. The electronic program guide in the grid layout format illustrated in FIG. 2 (the layout data of the entire electronic program guide including the program-related information) is generated by the above program guide generation unit 60. The central control unit 11 then causes the display device 110 to display an image based on the electronic program guide.

Figure 12:
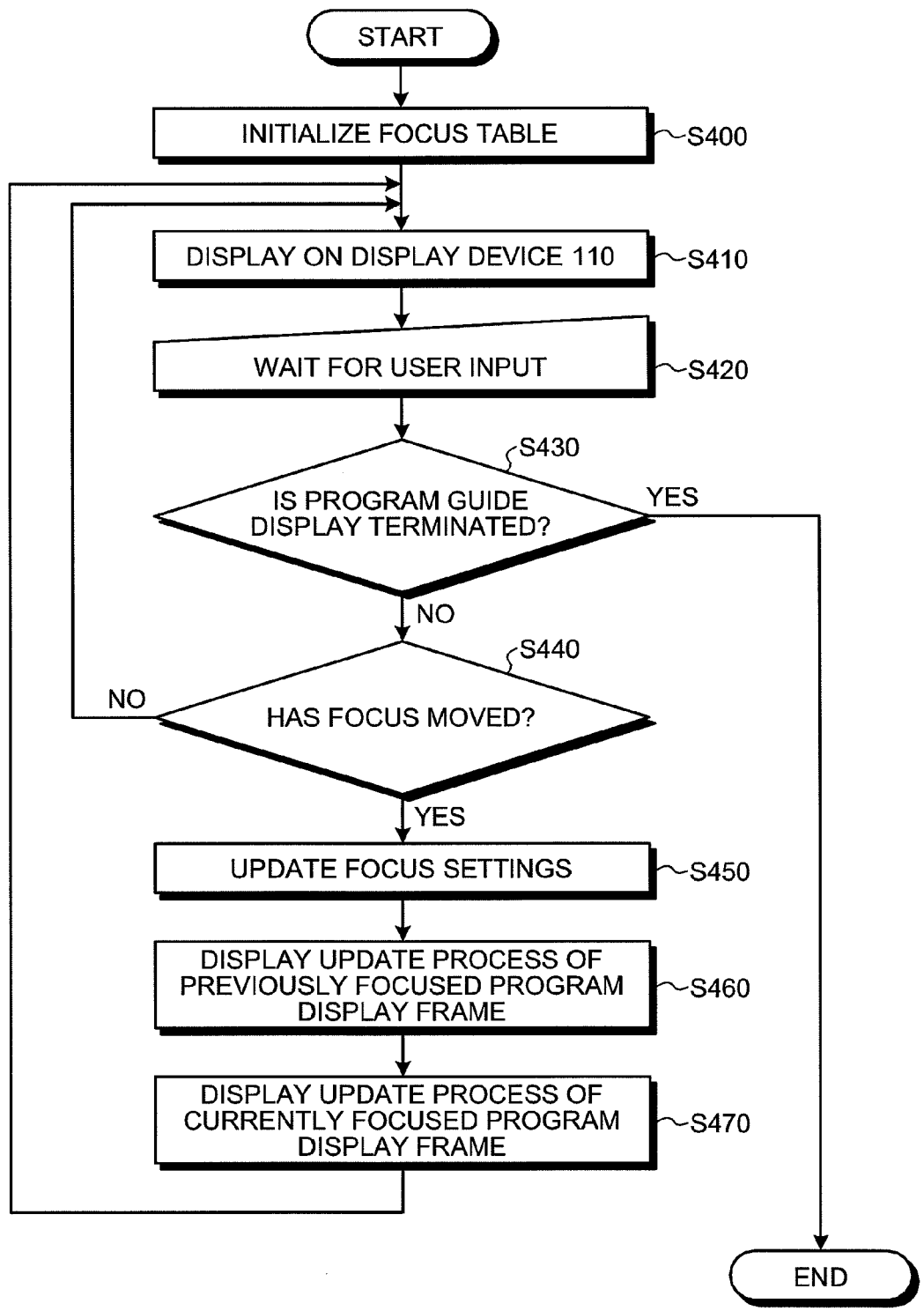
FIG. 12 is a flowchart illustrating a process flow of a program guide operation unit.

The description returns to FIG. 1. The program guide operation unit 70 performs the processes of displaying the electronic program guide in accordance with the layout data as well as judging whether or not the focus has been moved by the user operation inputted by the input device 120 (whether or not the program display frame designated by the operation input from the input device has changed to another program display frame), causing the display update unit 80 to update the layout data of the electronic program guide whenever a movement of the focus occurs, and causing the display device 110 to display the updated layout data. A description will be given of the process flow of the program guide operation unit 70 with reference to the flowchart of FIG. 12.

Firstly, the program guide operation unit 70 generates in the main memory 13 a table storing the program-related information ID of a program display frame that is currently being focused and the program-related information ID of a program display frame that was focused immediately before the currently focused program display frame (hereinafter referred to as the focus table) (Step S400). The program display frame that is currently being focused is referred to as the currently focused program display frame, and the program display frame that was focused immediately before the currently focused program display frame as the previously focused program display frame. In the initial state, null values are set for both of the program-related information ID of the currently focused program display frame and the program-related information ID of the previously focused program display frame. FIG. 13 is an example illustrating a focus table storing focus states. FIG. 13 illustrates a state of storing the program-related information ID, "program 1," as the currently focused program display frame and the program-related information ID, "program 2," as the previously focused program display frame.

Next, the program guide operation unit 70 converts the layout data of the electronic program guide into image data to output the image data, and causes the display device 110 to display the image data (Step S410).

Next, the program guide operation unit 70 waits for an input of information from a user (Step S420). Incidentally, the user inputs the information via the input device 120.

Next, the program guide operation unit 70 judges whether or not the information inputted by the user was an input to terminate the operation of the program guide (Step S430). Specifically, a button to terminate the operation of the program guide is placed on the display device 110, and in cases such as where it is judged that the button was pressed, or a power button or end button provided for the input device 120 was pressed, the operation of the program guide is terminated. If an input to terminate the operation of the program guide is performed, the processing of operating the program guide is terminated, otherwise execution proceeds to Step S440.

Figure 14A:
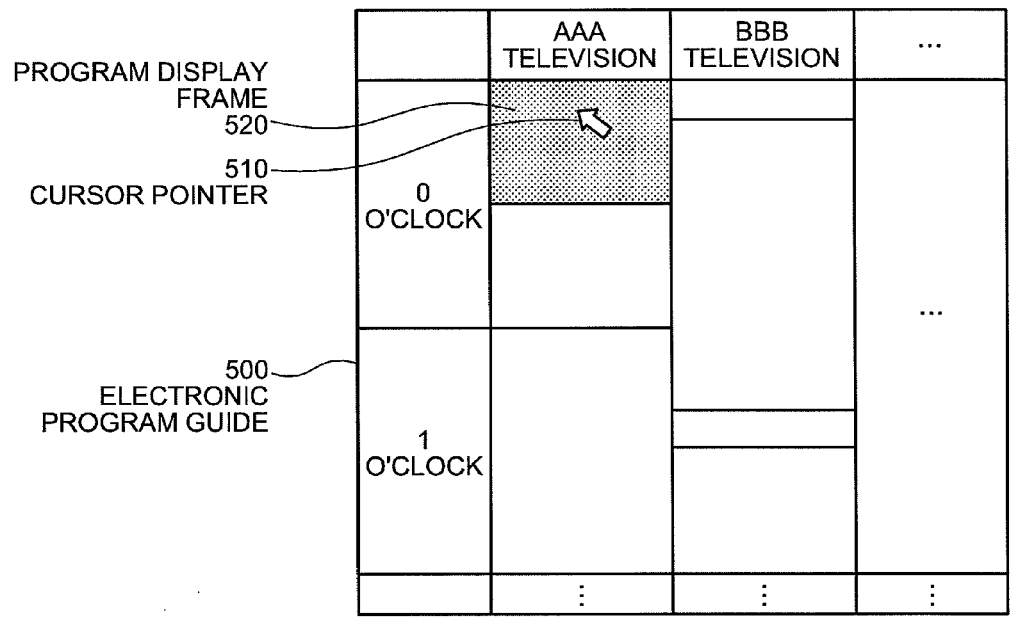
FIGS. 14A and 14B are views schematically illustrating focus transition.
Figure 14B:
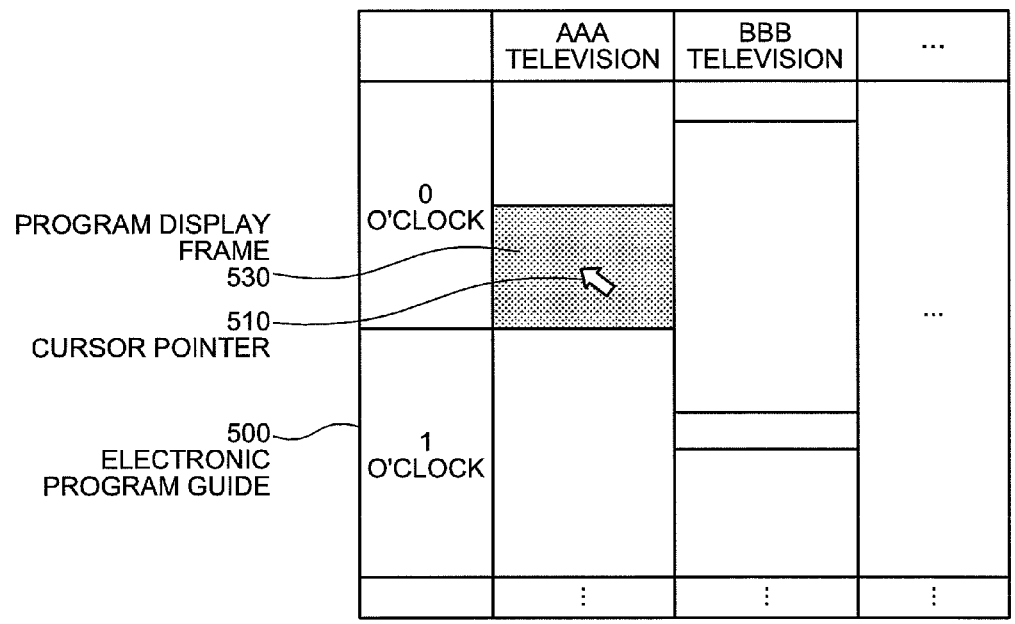

Next, if the information inputted by the user was not an input to terminate the operation of the program guide (Step S430, No), it is judged whether or not the user input has moved the focus of the program display frame to other than the currently focused program display frame (Step S440). Here, a description will be given of a judgment about a focus state using the example of the electronic program guide illustrated in FIGS. 14A and 14B. In FIGS. 14A and 14B, an electronic program guide 500 and a cursor pointer 510 are displayed, and the cursor pointer 510 is moved in accordance with an operation input via the input device 120 such as a mouse or cross key. In FIG. 14A, the cursor pointer 510 is being displayed in the position of a program display frame 520. If in this state, the program guide operation unit 70 is focusing the program display frame 520. In other words, the currently focused program display frame is the program display frame 520. If the cursor pointer 510 moves from this state to a state illustrated in FIG. 14B, the cursor pointer 510 is displayed in the position of a program display frame 530. In other words, in this state, the program display frame 530 is being focused; accordingly, it is judged that the focus has moved to other than the program display frame 520 being the currently focused program display frame in the state of FIG. 14A.

If it is judged that the focus of the program display frame has moved (Step S440, Yes), the program guide operation unit 70 updates the focus settings (Step S450). Specifically, a program-related information ID corresponding to the currently focused program display frame stored in the focus table is set as a program-related information ID corresponding to the previously focused program display frame, and a program-related information ID corresponding to the program display frame that has newly acquired the focus is set as the currently focused program display frame. Moreover, if the focus has moved to a position outside any program display frames such as outside the program guide, the program-related information ID of the currently focused program display frame is changed to a null value.

Next, the program guide operation unit 70 passes (outputs) to the display update unit 80 a broadcasting station ID corresponding to a broadcasting station frame having the previously focused program display frame in order to update the display of the broadcasting station frame having the previously focused program display frame, and the display is updated (Step S460). A description will be later given of the display update process performed by the display update unit 80.

Next, the program guide operation unit 70 passes to the display update unit 80 a broadcasting station ID corresponding to a broadcasting station frame having the currently focused program display frame in order to update the display of the broadcasting station frame having the currently focused program display frame, and the display is updated (Step S470). A description will be later given of the display update process performed by the display update unit 80.

Next, returning to Step S410, the program guide operation unit 70 causes the display device 110 to display the layout of a new electronic program guide.

The above is the description of the program guide operation unit 70. Incidentally, if the broadcasting station frame having the previously focused program display frame and the broadcasting station frame having the currently focused program display frame are the same, Step S460 may be omitted.

Figure 15:
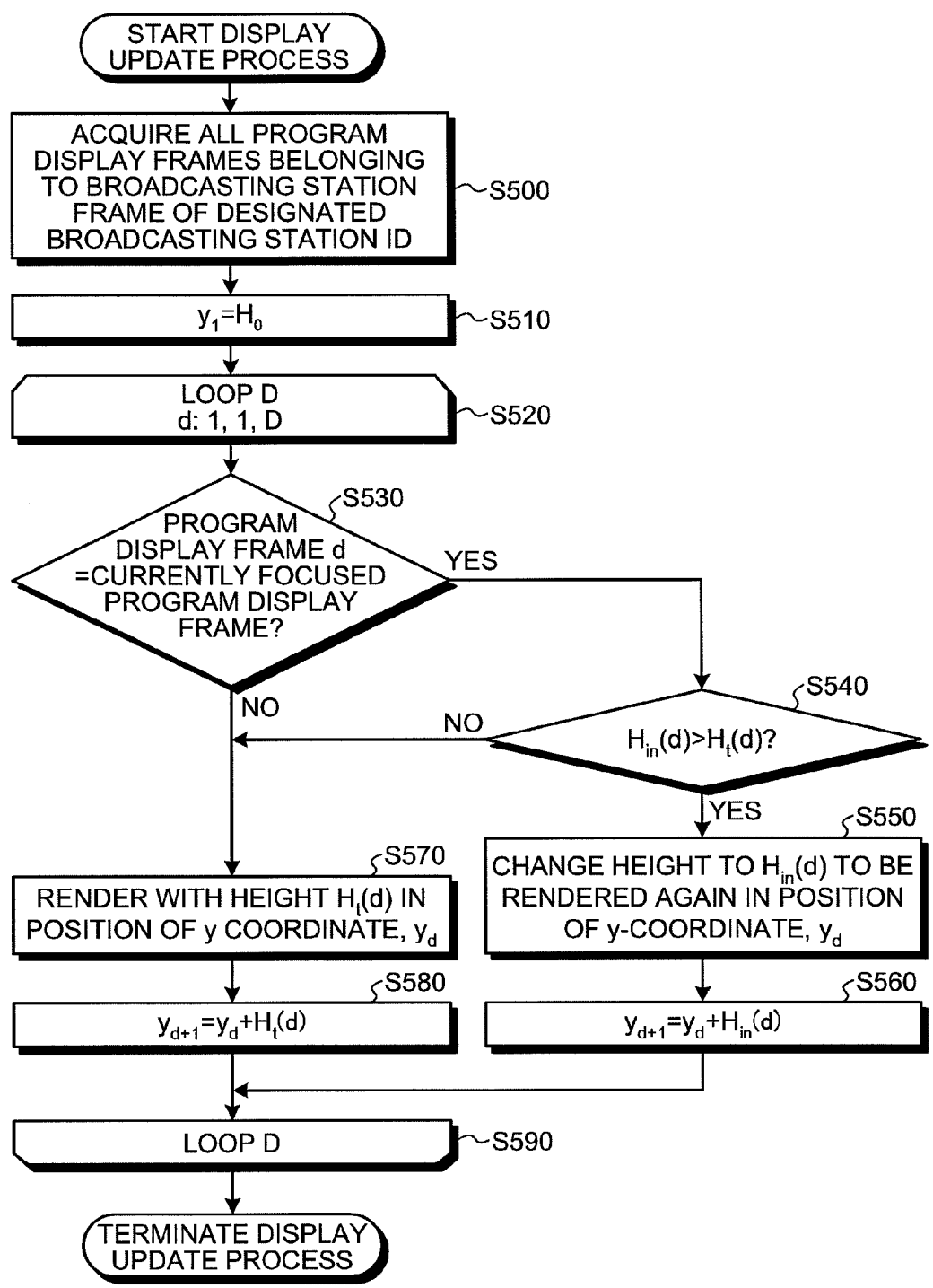
FIG. 15 is a flowchart illustrating a process flow of a display update unit in the first embodiment.

The display update unit 80 performs the display update process of updating the display of a broadcasting station ID passed from the program guide operation unit 70. A description will be given of a process flow of the display update unit 80 with reference to the flowchart of FIG. 15.

Firstly, the display update unit 80 acquires all of the layout data of program display frames belonging to a broadcasting station frame corresponding to a broadcasting station ID passed for the process and the associated program-related information IDs (Step S500).

Next, the display update unit 80 initializes an initial value of a variable indicating a y-coordinate value to the height $H_0$ of the display frame of a broadcasting station name (Step S510).

Next, assuming that the number of program display frames acquired in Step S500 is D, the display update unit 80 executes the iterations of a loop until a loop counter d starting at one in increments of one reaches an end value D for a loop identifier "loop D" (Step S520).

Next, the display update unit 80 judges whether or not a program-related information ID corresponding to the d-th program display frame (hereinafter referred to as the program display frame d) that belongs to the broadcasting station frame is the same as a program-related information ID corresponding to the currently focused program display frame (Step S530). If it is, execution proceeds to Step S540, and if not, execution proceeds to Step S570.

Next, if it is judged that the program-related information ID corresponding to the program display frame d is the same as the program-related information ID of the current focus (Step S530 Yes), the display update unit 80 judges whether or not an inside content height $H_{in}(d)$ obtained from the program-related information corresponding to the program display frame d is greater than a time-base height $H_t(d)$ (Step S540). If $H_{in}(d) > H_t(d)$, execution proceeds to Step S550, otherwise execution proceeds to Step S570.

In Step S540, if it is judged that $H_{in}(d) > H_t(d)$ (Step S540, Yes), the height of the program display frame d is changed to $H_{in}(d)$, and the program display frame d is rendered again in a position where the y-coordinate is $y_d$ (Step S550). Since the height of the program display frame is $H_{in}(d)$, program-related information items rendered inside are not clipped, but are all displayed. Incidentally, the content rendered in the program display frame is rendered in accordance with the layout settings in the program display frame layout storing unit 23 similarly to Step S300 in FIG. 11.

Next, the variable $y_d$ indicating the rendering start position of the y coordinate of the program display frame is updated (Step S560). Assuming that the current y-coordinate value is $y_d$ and the inside content height of the program display frame d is $H_{in}(d)$, a variable $y_{d+1}$ indicating a new y-coordinate value is obtained by the following mathematical expression (4).

$$y_{d+1} = y_d + H_{in}(d) \quad (4)$$

When the update process of the y coordinate is terminated, execution proceeds to Step S590.

Here, if it is judged in Step S530 that the program-related information ID corresponding to the program display frame d is different from the program-related information ID of the current focus (Step S530, No), or if it is judged in Step S540 that $H_{in}(d) H_t(d)$ (Step S540, No), the y coordinate is rendered in the position indicated by $y_d$, setting the height of the program display frame d to the time-base height $H_t(d)$ (Step S570). Incidentally, the content rendered in the program display frame is rendered in accordance with the layout settings in the program display frame layout storing unit 23 similarly to Step S300 in FIG. 11.

Next, the display update unit 80 updates the variable $y_d$ indicating the rendering start position of the y coordinate of the program display frame (Step S580). Assuming that the current y-coordinate value is $y_d$ and the time-base height of the program display frame d is $H_t(d)$, the variable $y_d+1$ indicating a new y-coordinate value is obtained by the following mathematical expression (5).

$$y_{d+1} = y_d + H_t(d) \quad (5)$$

When the update process of the y coordinate is terminated, execution proceeds to Step S590.

The symbol shown in Step S590 is a loop termination symbol of a loop D. If the loop D satisfies the termination condition, the display process is terminated, and if the termination condition is not satisfied, execution returns to Step S520 to repeat the processing.

The above is the description of the display update process by the display update unit 80.

Here, FIGS. 16A and 16B illustrate a specific example of a layout change in an electronic program guide occurring due to the movement of the focus. Only "17:25" being the start time is being displayed in the program display frame 520 in FIG. 16A. This indicates that the calculated time-base height is too short to contain the program title and the program summary in the program display frame; accordingly, the program title and the program summary have been clipped. Moreover, the cursor pointer 510 is not on any program display frames, so that a null value is put for the currently focused program display frame. Assuming that the cursor pointer 510 moves onto the program display frame 520 from this state as illustrated in FIG. 16B; accordingly, a program display frame 540 is set as the currently focused program display frame, the height of the program display frame 540 is changed to the inside content height. By changing the height of the program display frame 540 to the inside content height, the content described in the program display frame 540 is not clipped and the whole content is displayed. Moreover, if the state of FIG. 16B is changed to a state where the program display frame 540 is being not focused, the program display frame 540 is set as the previously focused program display frame to render a broadcasting station frame belonging to the program display frame 540 gain. Upon the rendering, the program display frame 540 is changed to the time-base height again.

According to the above program guide generation apparatus 1, it is possible to present a user with a program guide that keeps the time axis direction of the program guide compact without losing the display area of the program guide and omitting the program information by extending and displaying a program display frame of a focused part alone to be the center of a user's line of sight in a vertical direction as necessary.

Figure 17A:
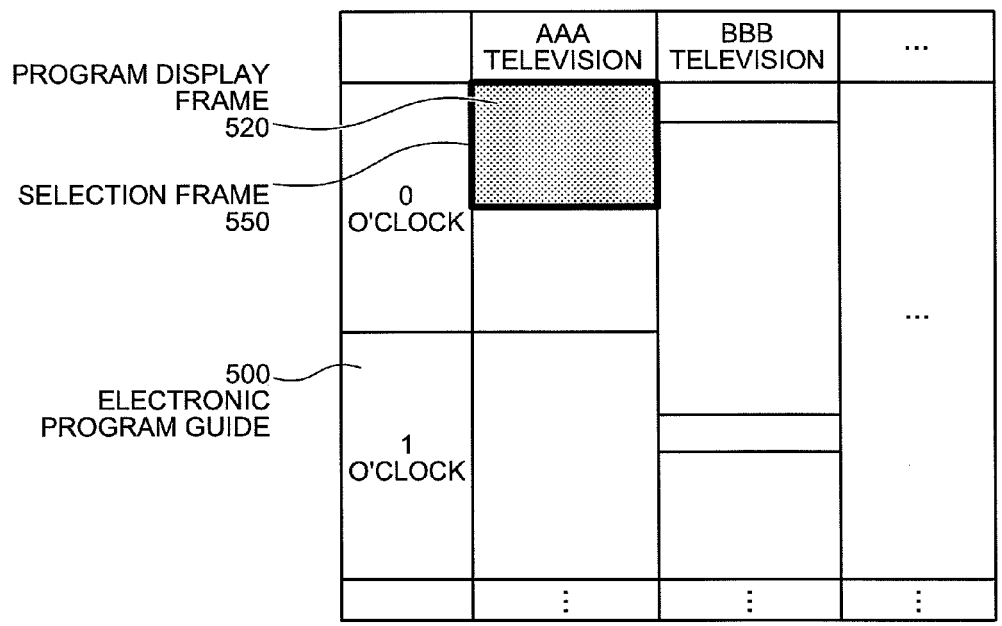
FIGS. 17A and 17B are views illustrating focus transition by a selection frame.
Figure 17B:
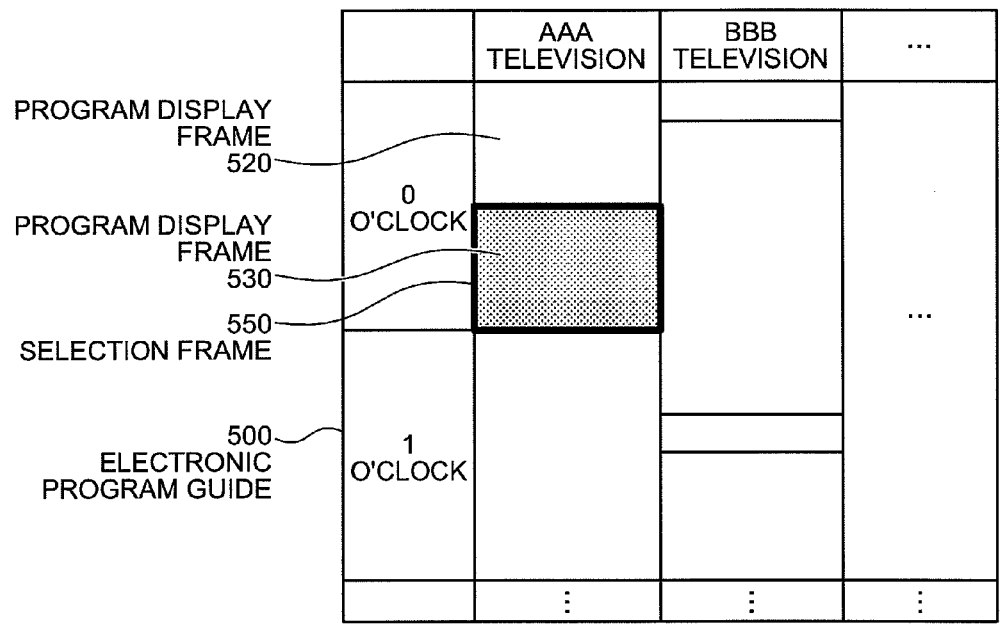

Incidentally, the user operates the cursor pointer 510 via the input device 120 to change the focus in the above-mentioned description of the program guide operation unit 70; however, a selection frame showing the focus state may be moved by not the cursor pointer 510 but an input from the cross key. A description will be given of a method for switching the focus of an electronic program guide in a selection frame system with reference to FIGS. 17A and 17B. FIG. 17A illustrates a state where a selection frame 550 showing the focus is being displayed on the program display frame 520 on the electronic program guide 500. In other words, in the state of FIG. 17A, the program display frame 520 is set as the currently focused program display frame. If the user performs an input for downward movement (for example, pressing the down button of the cross key) via the input device 120 from this state, the selection frame 550 is moved to the program display frame 530 placed directly below the program display frame 520 as illustrated in FIG. 17B. In other words, the program display frame 530 is set as the currently focused program display frame.

Incidentally, if the program display frame is scaled up from the time-base height to the inside content height or scaled down from the inside content height to the time-base height, expansion or contraction animation may be displayed.

Moreover, a program guide to be generated is designed to place the time frame in the vertical direction and the broadcasting station frame in the horizontal direction but conversely, may be designed to place the time frame in the horizontal direction and the broadcasting station frame in the vertical direction. In this case, embodiment is possible in a manner where a numeric value expressed as "height" in the above description is set to "width" and conversely, a numeric value expressed as "width" is set to "height".

As described above, according to a program guide generation apparatus, a program guide generation method, and a program guide generation program of the embodiment, it is possible to generate a program guide that can display program information without any omission and is highly viewable and compact.

Second Embodiment

In the program guide generation apparatus 1 in the first embodiment, the focus moves to change the heights of program display frames to a time-base height and an inside content height; accordingly, it is possible to compactly display detailed information on programs. In a program guide generation apparatus 2 in the embodiment can generate a program guide with higher viewability. Firstly, a description will be given of the effect exerted by the program guide generation apparatus 2 of the embodiment with reference to FIGS. 18A, 18B and 18C.

Figures 18A, 18B, 18C:
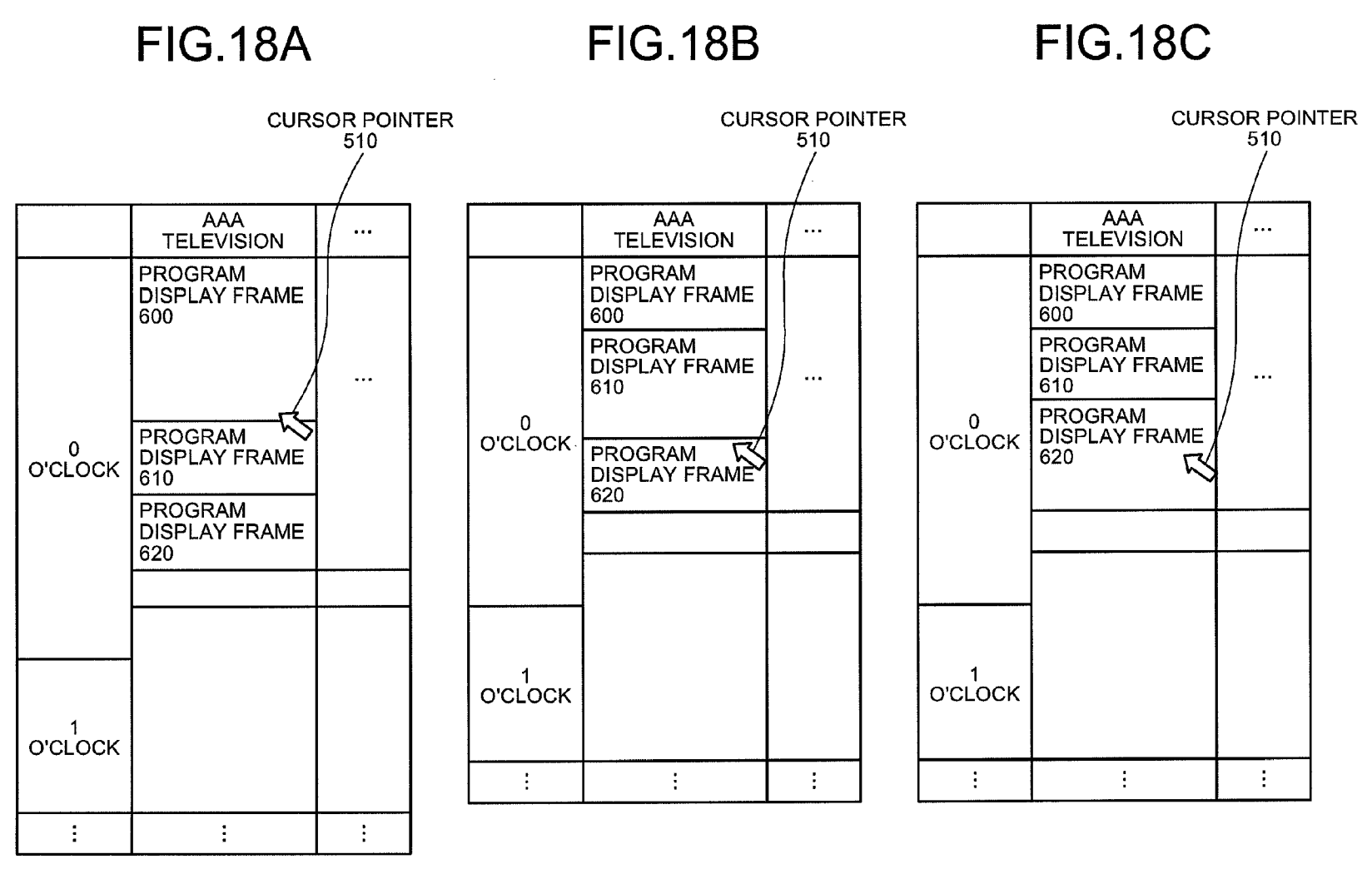

FIGS. 18A, 18B and 18C are views illustrating an example that the previously focused program display frame becomes an element directly above the currently focused program display frame. Specifically, in FIG. 18A, a cursor pointer 510 is on a program display frame 600. In other words, the currently focused program display frame is the program display frame 600. Assume that a user performs the operation of moving the position of the cursor pointer 510 from this state to a program display frame 610 to change the focus. At this time, the height of the program display frame 600 is changed to the time-base height with the change to the state where the program display frame 600 is not being focused, and the program display frame 610 is being focused to change the height of the program display frame 610 to the inside content height. At this time, if the inside content height of the program display frame 610 is less than the inside content height of the program display frame 600, the case where the cursor pointer 510 is not on the program display frame 610 occurs. This state is illustrated in the view of FIG. 18B, and the cursor pointer 510 illustrated in FIG. 18B is not on the program display frame 610, but is displayed on a program display frame 620. If the state turns to this, the movement of the focus occurs again, and the height of the program display frame 610 is changed to the time-base height, and the height of the program display frame 620 is changed to the inside content height. FIG. 18C is a view illustrating the result of the final focus movement. This can be user's unintended result of focusing on the program display frame 620, while the user wants to focus on the program display frame 610. The program guide generation apparatus 2 of the embodiment exerts the effect that can solve the problem. A detailed description will hereinafter be given of such a program guide generation apparatus 2.

FIG. 19 is a block diagram illustrating a configuration of the program guide generation apparatus 2 in the second embodiment. The block configuration of the program guide generation apparatus 2 is similar to the block configuration of the program guide generation apparatus 1 in the first embodiment; however, the operation of the display update unit 80 of the program guide generation apparatus 1 is different in the program guide generation apparatus 2. Accordingly, a description will be given as a display update unit 80A in the program guide generation apparatus 2. The other units are similar to those in the program guide generation apparatus 1, so that the description will be omitted.

Figure 20:
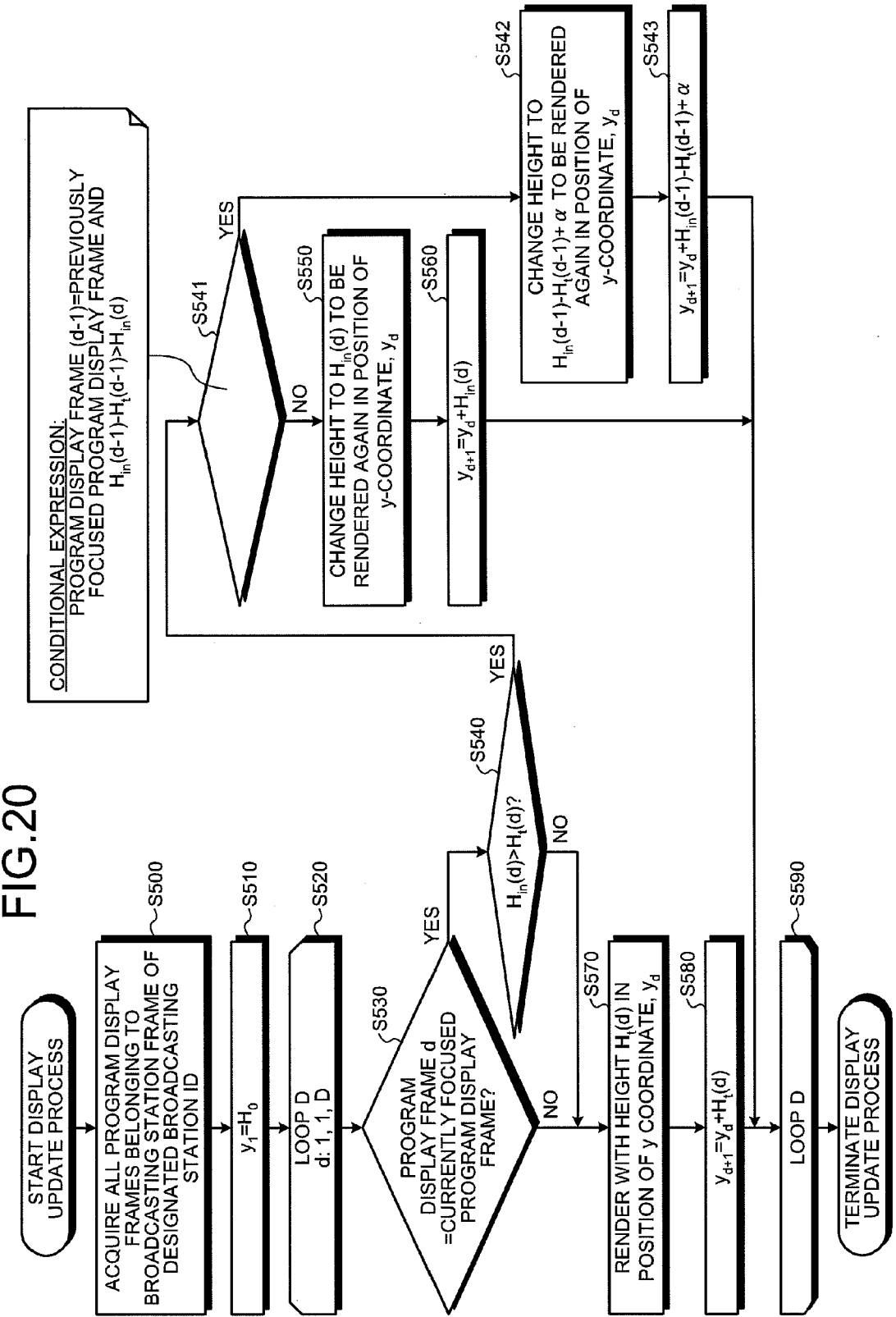
FIG. 20 is a flowchart illustrating a process flow of a display update unit in the second embodiment.

The display update unit 80A performs the display update process of updating the display of a broadcasting station ID passed from the program guide operation unit 70. A description will be given of a process flow of the display update unit 80A with reference to the flowchart of FIG. 20. Incidentally, if the processes are the same as those of the display update unit 80 in the program guide generation apparatus 1 illustrated in FIG. 15, the step numbers denotes the same.

Firstly, the process contents from Step S500 being the process of acquiring all program display frames belonging to a broadcasting station frame of a designated broadcasting station ID to Step S540 of the judgment process are similar to those of the display update unit 80 of the program guide generation apparatus 1, so that the description will be omitted.

If the display update unit 80A judges that the inside content height $H_{in}(d)$ is greater than the time-base height $H_t(d)$ (Step S540, Yes), the display update unit 80A judges whether or not the previously focused program display frame is the same as a program display frame d−1 being a program display frame directly above the current program display frame d and judges whether or not the difference between the inside content height $H_{in}(d-1)$ of the program display frame d−1 and the time-base height $H_t(d-1)$ of the program display frame d−1 is greater than the inside content height $H_{in}(d)$ of the program display frame d. If the two judgments are both true, execution proceeds to Step S542, otherwise execution proceeds to Step S550.

If the program display frame d−1 is the previously focused program display frame, and it is judged that $H_{in}(d-1)-H_t(d-1) > H_{in}(d)$ (Step S541, Yes), the height of the program display frame d is changed to $H_{in}(d-1)-H_t(d-1)+\alpha$, and the program display frame d is rendered again, setting the y coordinate in a position of $y_d$ (Step S542). α is a certain value for adjusting the height of the program display frame d, and is set to approximately 5 to 50 px. Incidentally, the content rendered in the program display frame is rendered in accordance with the layout settings in the program display frame layout storing unit 23 similarly to Step S300 illustrated in FIG. 11.

Incidentally, the difference value, $H_{in}(d-1)-H_t(d-1)$ between the inside content height and time-base height of the program display frame d−1 is a value representing a size that the height of the previously focused program display frame contracts from the inside content height to the time-base height. It is possible to prevent the cursor pointer from moving out of the currently focused program display frame by taking the height of the currently focused program display frame greater than the difference value.

Next, the display update unit 80A changes the coordinate value y (Step S543). Assuming that the current y-coordinate value is $y_d$, the inside content height of the program display frame d−1 is $H_{in}(d-1)$, and the time-base height of the program display frame d−1 is $H_t(d-1)$, the updated y-coordinate value, $y_{d+1}$, is obtained by the following mathematical expression (6).

$$y_{d+1} = y_d + H_{in}(d-1) - H_t(d-1) + \alpha \quad (6)$$

When the y-coordinate value is updated, execution proceeds to Step S590.

Steps S550, S560, S570, S580, and S590 are similar to the operations of the display update unit 80 in the program guide generation apparatus 1, so that the description will be omitted.

According to the above program guide generation apparatus 2, if the previously focused program display frame is a cell directly above the currently focused program display frame, there has been a problem that the currently focused program display frame immediately loses the focus; however, the problem can be solved by taking the height of the currently focused program display frame larger than the contraction size of the previously focused program display frame.

As described above, according to the program guide generation apparatus, the program guide generation method, and the program guide generation program of the present invention, it is possible to present a user with a program guide that keeps the time axis direction of the program guide compact without losing the display area of the program guide and omitting the program information by extending and displaying a program display frame in a focused part alone to be the center of a user's line of sight in the time axis direction as necessary.

Incidentally, the present invention includes programs for causing a computer to realize the functions of the program guide generation apparatuses of the embodiments. These programs may be read from a recording medium to be captured into a computer, or may be transferred via a communication network to be captured into a computer.

Moreover, the present invention is not limited to the embodiments described above, and various modifications can be made in a scope without departing from the gist of the present invention. For example, the program display frame is not necessary to be a rectangle, but may be another polygon or a circle.

According to a program guide generation apparatus, a program guide generation method, and a program guide generation program of the present invention, it is possible to generate a program guide that can display program information without any omission and is highly viewable and compact.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A program guide generation apparatus comprising:
  a computerized program-related information acquisition unit configured to acquire program-related information including information related to a start time of a broadcast program, information related to a broadcast duration length being the length of the duration of the broadcast of the broadcast program, and bibliographical information on the broadcast program, for each broadcast program;
  a computerized program display frame size calculation unit configured to calculate a time-base size obtained from the broadcast duration length and calculate an inside content size being a size of a program display frame being a cell to display the program-related information, the size being necessary to display all of first program-related information being information to be displayed in the program display frame among the program-related information, based on the first program-related information;
  a computerized program guide generation unit configured to generate layout data of the program display frame in accordance with the time-base size calculated by the program display frame size calculation unit; and
  a computerized display update unit configured to compare a first difference value of a height of a first program display frame and a second difference value of a height of a second program display frame when a focused program display frame is changed from the first program display frame to the second program display frame by an operation input inputted via an input device, the first difference value representing scaling down by changing a size of the first program display frame from the inside content size to the time-base size, the second difference value representing scaling up by changing a size of the second program display frame from a second inside content size of the second program display frame to a second time-base size of the second program display frame, and change the size of the first program display frame to the inside content size when the first difference value is bigger than the second difference value, wherein the first difference value is a function of a difference between the inside content size and the time-base size of the first program display frame and the second difference value is a function of a difference between the second inside content size and the second time-base size of the second program display frame.

2. A program guide generation method comprising:

accruing, by one or more computers, program-related information including information related to a start time of a broadcast program, information related to a broadcast duration length being the length of the duration of the broadcast of the broadcast program, and bibliographical information on the broadcast program, for each broadcast program;

calculating, by the one or more computers, a time-base size obtained from the broadcast duration length and calculating an inside content size being a size of a program display frame being a cell to display the program-related information, the size being necessary to display all of first program-related information being information to be displayed in the program display frame among the program-related information, based on the first program-related information;

generating, by the one or more computers, layout data of the program display frame in accordance with the time-base size calculated by the program display frame size calculation unit;

comparing, by the one or more computers, a first difference value of a height of a first program display frame and a second difference value of a height of a second program display frame when a focused program display frame is changed from the first program display frame to the second program display frame by an operation input inputted via an input device, the first difference value representing scaling down by changing a size of the first program display frame from the inside content size to the time-base size, the second difference value representing scaling up by changing a size of the second program display frame from a second inside content size of the second program display frame to a second time-base size of the second program display frame; and changing, by the one or more computers, the size of the first program display frame to the inside content size when the first difference value is bigger than the second difference value, wherein the first difference value is a function of a difference between the inside content size and the time-base size of the first program display frame and the second difference value is a function of a difference between the second inside content size and the second time-base size of the second program display frame.

3. A non-transitory computer-readable recording medium that stores therein a computer program for outputting information, the computer program causing a computer to execute:

accruing program-related information including information related to a start time of a broadcast program, information related to a broadcast duration length being the length of the duration of the broadcast of the broadcast program, and bibliographical information on the broadcast program, for each broadcast program;

calculating a time-base size obtained from the broadcast duration length and calculating an inside content size being a size of a program display frame being a cell to display the program-related information, the size being necessary to display all of first program-related information being information to be displayed in the program display frame among the program-related information, based on the first program-related information;

generating layout data of the program display frame in accordance with the time-base size calculated by the program display frame size calculation unit; and comparing, by the one or more computers, a first difference value of a height of a first program display frame and a second difference value of a height of a second program display frame when a focused program display frame is changed from the first program display frame to the second program display frame by an operation input inputted via an input device, the first difference value representing scaling down by changing a size of the first program display frame from the inside content size to the time-base size, the second difference value representing scaling up by changing a size of the second program display frame from a second inside content size of the second program display frame to a second time-base size of the second program display frame; and changing the size of the first program display frame to the inside content size when the first difference value is bigger than the second difference value, wherein the first difference value is a function of a difference between the inside content size and the time-base size of the first program display frame and the second difference value is a function of a difference between the second inside content size and the second time-base size of the second program display frame.

* * * * *